United States Patent Office 2,932,673
Patented Apr. 12, 1960

2,932,673

VAPOR PHASE DEHYDROGENATION REACTIONS AND CATALYSTS USED IN PROMOTING THEM

John S. Melik, Harvey, and Henry Erickson, Park Forest, Ill., assignors to Sinclair Refining Company, New York, N.Y., a corporation of Maine No Drawing. Application April 9, 1957
Serial No. 651,594

5 Claims. (Cl. 260—666)

This invention relates to vapor phase dehydrogenation reactions and to catalytic materials useful in promoting them. More particularly, the invention is concerned with catalysts prepared by calcining a mixture of magnesium oxide and a material selected from the group consisting of hydrated titanium dioxide and hydrated zirconium dioxide, and to the use of the catalytic components in dehydrogenating hydrocarbon materials in the vapor phase.

It has been found that the products obtained by the calcination of a mixture of magnesium oxide and hydrated titanium dioxide or hydrated zirconium dioxide or their mixture are effective and selective catalytic materials for promoting the dehydrogenation of hydrocarbons. The calcined mixtures of oxides can be used as the catalysts or they can be employed as base materials for supporting minor amounts of promoting components such as $Cr_2O_3$, $MgCr_2O_3$ and $CuCr_2O_3$ which may be added to the mixed oxides either before or after their calcination.

In the oxide mixture calcined, the ratio of magnesium oxide to titanium dioxide or zirconium dioxide or their mixture can be varied as long as each is present in an amount sufficient to provide a catalytic effect. Preferably, the molar ratio of these components is about 0.1 to 1.0 of the magnesium oxide to 1 mole of titanium dioxide or zirconium dioxide or their mixture. Advantageously, the oxides are subjected to water digestion prior to calcination to obtain an intimate mixture. Thus, the oxide mixture catalyst component can be made by digesting in a water medium magnesium oxide and hydrated titanium or zirconium dioxide, separating solid digestion residue from the accompanying aqueous phase and calcining the mixture of digested oxides. The calcination of the mixed oxides can be effected at temperatures of at least about 400° C., preferably about 450 to 700° C. Generally, the calcination is for at least 0.5 hour, for instance in an air or other gas, while the digestion if employed is for at least about 6 hours, preferably about 16 to 24 or more hours.

The various dehydrogenatable hydrocarbons can be treated in accordance with the present invention. Usually these materials contain from 2 to 20 carbon atoms and preferably up to 12 carbon atoms. Advantageously, the hydrocarbon feed contains an aliphatic or cycloaliphatic structure of 2 to 8 carbon atoms or a corresponding olefinic structure. Among these dehydrogenatable feeds are the alkanes, such as butane, heptane and pentane, which can be substituted as with aromatics such as benzene and naphthalene. Examples of these substituted materials are cumene, ethylbenzene and ethylnaphthalene. The cycloalkanes, such as cyclopentanes and cyclohexane can also be employed, and the feed could be a mixed alkane-cycloalkane exemplified by ethylcyclohexane. The corresponding olefins, particularly the mono-olefins, can also be used, for instance, the alkenes, cycloalkenes and the corresponding mixed olefins.

The conditions of reaction of this invention can be described generally as dehydrogenating conditions. The dehydrogenatable feed is essentially in the vapor phase and the preferred reaction conditions include temperatures of about 450 to 600° C., a dehydrogenatable material partial pressure of about 0.1 to 0.5 atmosphere, and space velocities of about 1 to 10 WHSV (weight of feed per weight of catalyst per hour). When the partial pressure of the dehydrogenatable hydrocarbon is less than atmospheric a vacuum can be utilized. However, it is preferred to operate at atmospheric total pressure while employing a sufficient amount of an inert gas such as nitrogen, steam, methane, etc., to afford the desired partial pressure of the dehydrogenatable material. The catalysts can be employed in any suitable system such as a fixed, moving or fluid bed process, and thus the catalysts can be in small particle form or of macrosize, for instance about 1/16 to 1/2" in diameter and about 1/16 to 1" or more in length. Conveniently, the macrosize catalyst particles can be provided by tableting or extrusion prior to or after calcination.

This invention may be better understood by reference to the following examples which are not to be considered limiting.

An oxide mixture suitable for use as the catalyst oxide component used in the method of the invention was made by dispersing 3100 grams of freshly precipitated hydrated titanium dioxide (equivalent to 351 grams of titanium dioxide, $TiO_2$) and 121 grams of calcined magnesite (equivalent to 117 grams of magnesium oxide, MgO) in 7 liters of water maintained at 71° C. The resulting mixture was digested at 71° C. for 24 hours while being stirred continuously. The digestion residue was then filtered from the aqueous phase and dried at 110° C. The dried digestion residue was then ground to −100 mesh and then calcined 2 hours at 570° C. Another catalyst is prepared by this procedure except that the mixture of oxides is not digested in water prior to calcination.

In another preparation, 3693 grams of an aqueous slurry containing freshly precipitated hydrated zirconia (equivalent to 212 grams $ZrO_2$) was heated to 160° F. with constant stirring. 37.6 grams of calcined magnesite (equivalent to 36.4 grams MgO) were added and the slurry digested for 24 hours at 71° C. with continuous stirring. The slurry was then filtered and the filter cake dried at 110° C. The dried product was ground to less than 20 mesh and calcined for 2 hours at 566° C. Analysis showed that the calcined material contained 20.3 weight percent of MgO. X-ray diffraction showed a small amount of MgO. The $ZrO_2$ was present as a high temperature-stable cubic structure. This structure is present at room temperature only if stabilized by magnesia. No magnesium zirconate was found. Another catalyst is prepared by this procedure except that the mixture of oxides is not digested in water prior to calcination.

These catalysts are employed to dehydrogenate in a glass reactor a number of hydrocarbon feed stocks at a space velocity of 3 WHSV and a total pressure of 1 atmosphere except when vacuum is utilized. The other conditions and the characteristics of the predominant products are given in the following table. Each of these runs is made using each of the catalysts prepared as noted above.

Table

| Dehydrogenatable Material | Temp., °C. | Dehydrogenatable Material, Partial Pres., Atmospheres | Diluent Gas | Predominant Product |
|---|---|---|---|---|
| Cumene | 505 | 0.35 | Nitrogen | Alpha-methyl styrene. |
| Ethylbenzene | 545 | 0.2 | Methane | Styrene. |
| Cyclohexane | 555 | 0.4 | Nitrogen | Benzene. |
| Cyclohexane | 600 | 0.35 | do | No substantial reaction.[1] |
| 2-methyl butene-2 | 550 | 0.35 | Methane | Isoprene. |
| Ethylcyclohexane | 475 | 0.4 | Nitrogen | Ethylbenzene. |
| Cyclohexane | 500 | 0.35 | None (vacuum) | Benzene. |

[1] No catalyst is present in this system.

It is claimed:

1. The method of dehydrogenating a dehydrogenatable hydrocarbon material containing from about 2 to 20 carbon atoms which comprises contacting said material in the vapor phase under dehydrogenating conditions with a catalytic material consisting essentially of the product obtained by digesting in water magnesium oxide and a material selected from the group consisting of hydrated titanium dioxide and hydrated zirconium dioxide to produce an intimate mixture containing about 0.1 to 1 mole of magnesium oxide to each mole of dioxide of said group, and calcining said mixture at about 400 to 700° C.

2. The method of dehydrogenating a dehydrogenatable hydrocarbon material containing from about 2 to 20 carbon atoms which comprises contacting said material in the vapor phase under dehydrogenating conditions at a temperature of about 450 to 600° C., a space velocity of about 1 to 10 WHSV and a partial pressure of said material of about 0.1 to 0.5 atmosphere with a catalytic material consisting essentially of the product obtained by digesting in water magnesium oxide and a material selected from the group consisting of hydrated titanium dioxide and hydrated zirconium dioxide to produce an intimate mixture containing about 0.1 to 1 mole of magnesium oxide to each mole of dioxide of said group, and calcining said mixture at about 400 to 700° C.

3. A catalytic material obtained by digesting in water magnesium oxide and a material selected from the group consisting of hydrated titanium dioxide and hydrated zirconium dioxide to obtain an intimate mixture consisting essentially of about 0.1 to 1 mole of magnesium oxide for each mole of dioxide of said group, and calcining said mixture at about 400 to 700° C.

4. A method for preparing a catalytic material comprising digesting in water magnesium oxide and a material selected from the group consisting of hydrated titanium dioxide and hydrated zirconium dioxide to produce an intimate mixture containing about 0.1 to 1 mole of magnesium oxide to each mol of dioxide of said group, and calcining said mixture at about 400 to 700° C.

5. The method of claim 4 wherein the oxides are digested in water for at least about 6 hours.

References Cited in the file of this patent
UNITED STATES PATENTS

| | | |
|---|---|---|
| 2,098,959 | Frey et al. | Nov. 16, 1937 |
| 2,305,327 | Thurnauer | Dec. 15, 1942 |
| 2,547,221 | Layng | Apr. 3, 1951 |
| 2,547,380 | Fleck | Apr. 3, 1951 |
| 2,638,455 | Pitzer | May 12, 1953 |
| 2,695,242 | Woodward | Nov. 23, 1954 |